(12) United States Patent
Parkerson (10) Patent No.: US 10,460,856 B1
(45) Date of Patent: Oct. 29, 2019

(54) BUS MOUNTS, POWER DISTRIBUTION SYSTEMS, AND METHODS FOR MOUNTING BUSES IN POWER DISTRIBUTION SYSTEMS

(71) Applicant: Siemens Industry, Inc., Alpharetta, GA (US)

(72) Inventor: Jason Parkerson, Mansfield, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 16/160,243

(22) Filed: Oct. 15, 2018

(51) Int. Cl.
*H01B 7/00* (2006.01)
*H01B 17/16* (2006.01)
*H02B 1/20* (2006.01)
*H01B 17/18* (2006.01)

(52) U.S. Cl.
CPC ............ *H01B 17/16* (2013.01); *H01B 17/18* (2013.01); *H02B 1/20* (2013.01)

(58) Field of Classification Search
USPC ................. 174/121 R; 439/723, 798, 115
See application file for complete search history.

(56) References Cited

U.S. PATENT DOCUMENTS

| | | | |
|---|---|---|---|
| 3,611,048 A * | 10/1971 | Shelvik | H01R 9/2408 361/650 |
| 5,222,366 A * | 6/1993 | Herd | F25D 19/006 505/892 |
| 6,040,976 A | 3/2000 | Bruner et al. | |
| 6,111,745 A | 8/2000 | Wilkie, II et al. | |
| 6,435,888 B1 | 8/2002 | Reed | |
| 6,814,628 B2 * | 11/2004 | Chadbourne | H01R 9/2408 439/717 |
| 8,437,118 B2 | 5/2013 | Kasza et al. | |
| 9,306,351 B2 * | 4/2016 | Huang | H01R 25/145 |
| 9,391,413 B2 | 7/2016 | Blasbalg et al. | |
| 9,608,413 B2 | 3/2017 | Kubota et al. | |
| 9,705,294 B2 | 7/2017 | Kubota et al. | |
| 2014/0099836 A1 * | 4/2014 | Joseph | H01R 4/30 439/723 |

OTHER PUBLICATIONS

Minimum Creepage Distances IEC_pp. 1-3_2007.*
Understanding Creepage Distances_Compliance Magazine pp. 1-4_Jan. 2014.*

* cited by examiner

*Primary Examiner* — Timothy J Thompson
*Assistant Examiner* — Guillermo J Egoavil (57) ABSTRACT

A power distribution system comprising a bus bar, a frame member, a support block formed from a non-conductive material and having a first side and an opposite second side, one or more first fasteners extending beyond the second side and mechanically coupled to the bus bar, one or more second fasteners extending beyond the first side and mechanically coupled to the frame member, a first insulator located between the first side of the support block and the frame member, and a second insulator located between the second side of the support block and the bus bar. Other apparatus and methods are also disclosed.

20 Claims, 9 Drawing Sheets

BUS MOUNTS, POWER DISTRIBUTION SYSTEMS, AND METHODS FOR MOUNTING BUSES IN POWER DISTRIBUTION SYSTEMS

FIELD

The present disclosure relates to assemblies, systems, and methods for electrical power distribution, and more specifically to bus mounts.

BACKGROUND

In power distribution systems (e.g., switchgear and switchboard systems), positioning components as close together as possible helps to minimize the overall space envelope of a power distribution system and enables improved user accessibility. However, the close proximity of various bus bars to each other as well as to other components can result in movement and bending of components due to large electromagnetic forces present during high current events (e.g., short circuit) and forces resulting from seismic events. Movement and bending of components may also occur during transportation and installation of the power distribution systems. If such movement and bending are sufficiently large, it is possible to have phase-to-phase contact and arcing between individual bus bars as well as between bus bars and grounded or neutral components within the power distribution systems.

Bus bar supports and/or braces may be used to help prevent such movement and bending of the various bus bars. However, bus bar supports and/or braces take up space within the power distribution systems and may limit the number of components, such as circuit breakers and splice joints that can fit within the power distribution systems. Moreover, additional bus bar supports and/or braces in a power distribution system may contribute to the formation of magnetic loops within the power distribution systems as well as making it difficult to meet industry standards for clearance and creepage distances.

Thus, there is a demand for bus mounts that provide sufficient support and/or bracing to withstand movement and bending of bus bars within compact power distribution systems.

SUMMARY

According to a first aspect, a power distribution system is provided. The power distribution system includes a bus bar, a frame member, a support block formed from a non-conductive material and having a first side and an opposite second side, one or more first fasteners extending beyond the second side to mechanically couple to the bus bar, and one or more second fasteners extending beyond the first side to mechanically couple to the frame member.

According to another aspect, a bus mount for a power distribution system is provided. The bus mount includes a support block formed from a non-conductive material having a first side and an opposite second side, one or more first fasteners extending beyond the second side and configured to mechanically couple to a bus bar, and one or more second fasteners extending beyond the first side and configured to mechanically couple to a frame member.

According to yet another aspect, a method of mounting a bus bar to a frame member in a power distribution system is provided. The method includes providing a support block formed from a non-conductive material, the support block including a first side and an opposite second side, one or more first fasteners extending from the second side, and one or more second fasteners extending from the first side; coupling one or more first fasteners extending from the second side to the bus bar; and coupling one or more second fasteners extending from the first side to the frame member.

Still, other aspects, features, and advantages of the present disclosure may be readily apparent from the following description by illustrating a number of example embodiments, including the best mode contemplated for carrying out the present disclosure. The present disclosure may also be capable of other and different embodiments, and its details may be modified in various respects, all without departing from the substance and scope of the present disclosure. The disclosure covers all modifications, equivalents, and alternatives falling within the substance and scope of the claims.

BRIEF DESCRIPTION OF DRAWINGS

The drawings, described below, are for illustrative purposes only and are not necessarily drawn to scale. The drawings are not intended to limit the scope of the disclosure in any way. Wherever possible, the same or like reference numbers will be used throughout the drawings to refer to the same or like parts.

DETAILED DESCRIPTION

Reference will now be made in detail to the example embodiments of this disclosure, which are illustrated in the accompanying drawings. The use of horizontal and vertical orientations is for description purposes and is not meant to limit the scope of the disclosure. Power distribution systems, including switchgears and switchboards, may distribute electric power to a plurality of different systems, locations, and devices. For example, an input to a power distribution system may be from a main power line, such as the main power line to a building. The power distribution systems may have circuits and the like that distribute power to a plurality of locations, such as different floors or areas in a building or to different pieces of heavy equipment. Power distribution systems may have a continuous current rating ranging from 800 A to 6 kA amperes and a short circuit rating ranging from 50 kA to 200 kA over a defined time interval, for example. In some embodiments, power distribution systems may monitor current flow to different locations and may include circuit breakers that disconnect power to these locations when these locations draw current greater than a predetermined amperage.

Power distribution systems may be fabricated in panelized structures that may include a plurality of cabinets or cabinet assemblies. A plurality of connected cabinets may be referred to as a lineup. Panels covering the fronts of the cabinets may include user controls, such as circuit breakers and monitoring devices. The interiors of the power distribution systems may be densely packed with controls, buses, splice joints, circuit breakers, and other components. Channel buses and their interconnections that distribute power to different locations and devices may be accessible to users by way of the panels located on the front of the cabinets.

In some embodiments, cabinet sections of a power distribution system may include a bus (e.g., a vertical bus) that supplies current to circuit breakers within the cabinet sections. The vertical bus may include a plurality of bus bars (e.g., vertical bus bars) supplied with current by channel bus bars (e.g., horizontal channel bus bars) running throughout the lineup of cabinet sections. A power distribution system may include an individual bus bar for each electrical phase of a multiple phase system. For example, a three-phase power distribution system may include four bus bars, one for each of the three voltage phases and one for neutral.

The vertical and horizontal bus bars within power distribution systems may be supported and/or braced to withstand electromagnetic forces created by high currents that flow through the power distribution system during high current events. Supports may include devices that mount a conductor (e.g., a conductor of a bus) to a frame or similar device within a power distribution system. Braces may include devices that brace conductors (e.g., conductors of a bus) to one another, such as to keep the conductors located at fixed distances relative to one another. High currents flowing through bus bars, such as the result of short circuit events, may create high electromagnetic forces strong enough to move and/or bend individual bus bars unless they are properly supported and/or braced. Forces resulting from seismic events may also be sufficiently strong to move and/or bend individual bus bars unless they are supported and/or braced. Supports and/or braces may also protect bus bars and other components from damage that may occur during transportation and installation of the power distribution systems.

Bus mounts are disclosed herein that support and/or brace bus bars, such as phase and neutral bus bars, within power distribution systems. A "bus" as used herein may include one or more bus bars, each bus bar configured to conduct a voltage or different phases of a voltage. A "bus bar" as used herein may include conductors within a bus, wherein each bus bar of a bus may conduct a different phase of a voltage. Each bus bar may include one or more conductors that are electrically connected together to conduct a single phase. For example, a bus bar may include one or more conductive bars that may be stacked, C-shaped, flat, and/or other shapes and that all conduct the same phase.

The bus mounts disclosed herein prevent bending and/or movement of bus bars when forces are applied to those bus bars. For example, these forces may include electromagnetic forces created during high current events, such as short circuit events, or forces resulting from seismic events. The bus mounts may support and/or brace both horizontal and vertical bus bars. The bus mounts may support and/or brace individual bus bars, such as an A-phase bus bar, a B-phase bus bar, and a C-phase bus bar in a three-phase system. The bus mounts may also support and/or brace neutral bus bars. The bus mounts may also ensure that clearance and creepage distances are within predetermined values.

Figure 1:
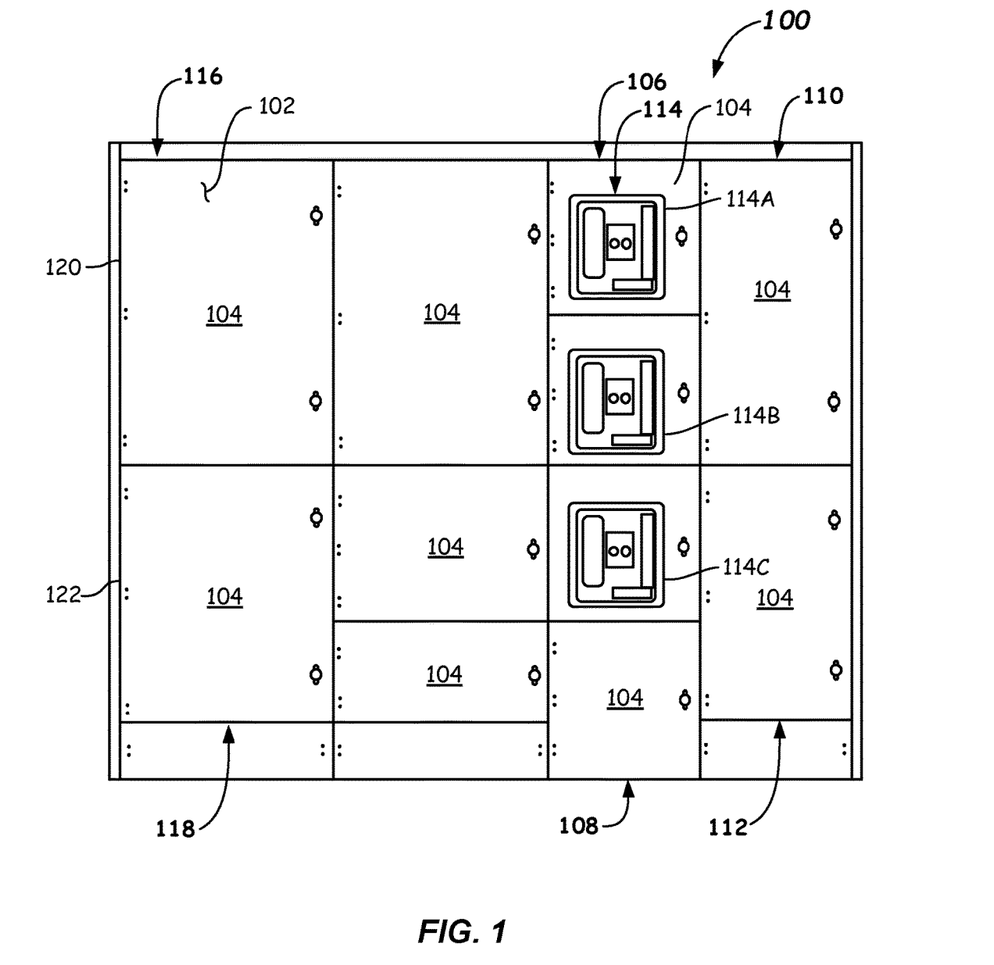
FIG. 1 illustrates a front view of a power distribution system according to one or more embodiments.

Reference is now made to FIG. 1, which illustrates a front view of an embodiment of a power distribution system 100 according to one or more embodiments. The power distribution system 100 may be a switchgear or switchboard, for example. The power distribution system 100 may include a front surface 102 including a plurality of panels 104 (a few labeled). A first plurality of cabinets 106 may include user interfaces 114, which may include controls, such as circuit breakers and other controllers to control and monitor power distribution to different locations or devices. The power distribution system 100 depicted in FIG. 1 includes three user interfaces, referred to individually as a first user interface 114A, a second user interface 114B, and a third user interface 114C. The components within the first plurality of cabinets 106 may be collectively referred to as the circuit breaker section 108 and may electrically couple to the user interfaces 114. In the embodiment depicted in FIG. 1, the first plurality of cabinets 106 of the circuit breaker section 108 may be vertically aligned.

A second plurality of cabinets 110 may contain terminal assemblies, bus assemblies, cables, and the like that electrically connect the power distribution system 100 to locations where power is consumed, such as locations in a building and power equipment. The second plurality of cabinets 110 is collectively referred to as the cable pull section 112. In the embodiment depicted in FIG. 1, the second plurality of cabinets 110 of the cable pull section 112 may be vertically aligned.

A third plurality of cabinets 116 may contain horizontally-oriented bus bars, vertically-oriented bus bars, branch buses, splice joints, and other components. These cabinets are collectively referred to as the incoming section 118. In the embodiment depicted in FIG. 1, the third plurality of cabinets 116 of the incoming section 118 may be vertically aligned. Bus mounts may be located in any one of the sections of the power distribution system 100, including the circuit breaker section 108, the cable pull section 112, and the incoming section 118.

Reference is now made to cabinets 120 and 122 in the incoming section 118, which may include panels 104 that are capable of being opened or removed to enable user access within the incoming section 118. Bus mounts (not shown in FIG. 1) located behind the panels 104 may be physically located within the incoming section 118 to support and/or brace phase and neutral bus bars. Thus, a user may access bus mounts in addition to other components from the front of the power distribution system 100.

Figure 2:
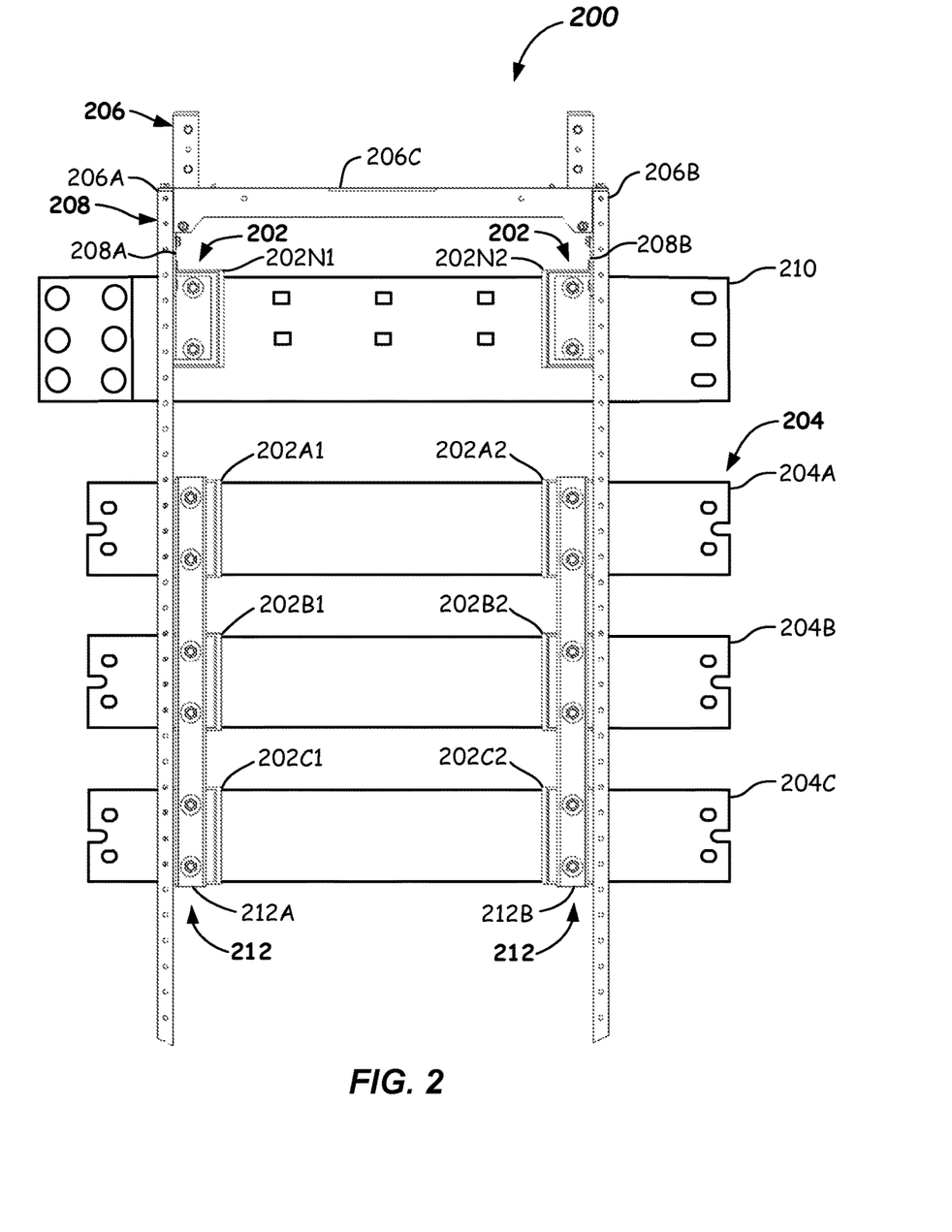
FIG. 2 illustrates a front elevation view of bus mounts bracing bus bars and supporting a neutral bus bar within a power distribution system according to one or more embodiments.

Reference is now made to FIG. 2, which illustrates a front view of bus mounts 202 bracing a phase bus 204 and supporting a neutral bus bar 210 within a section 200 of the power distribution system 100 (FIG. 1) according to one or more embodiments. The bus mounts 202 electrically insulate components of the phase bus 204 and the neutral bus bar 210 from frame members to which they are coupled.

The phase bus 204 may include a first bus bar 204A, a second bus bar 204B, and a third bus bar 204C. The neutral bus may include a single neutral bus bar 210. In some embodiments, the bus bars 204A-204C and the neutral bus bar 210 may be dual channel conductors, meaning that they each include two conductors, such as two C-shaped channels. In some embodiments, the bus bars 204A-204C and the neutral bus bar 210 may be one or more flat bus bars and may be at least part of the same bus.

The power distribution system 100 (FIG. 1) may distribute three-phase power (e.g., line power) by way of the bus bars 204A-204C and the neutral bus bar 210. Specifically, the power distribution system 100 may distribute an A-phase on the first bus bar 204A, a B-phase on the second bus bar 204B, a C-phase on the third bus bar 204C, and a relative ground or neutral on the neutral bus bar 210.

The power may be distributed throughout the power distribution system 100 (FIG. 1) by way of the phase bus 204 and the neutral bus bar 210. Specifically, the bus bars 204A-204C may provide three-phase power (e.g., A-phase, B-phase, C-phase, and neutral) to the incoming section 118 (FIG. 1) which may be electrically coupled to the circuit breaker section 108 (FIG. 1). Power may then be distributed to the cable pull section 112 (FIG. 1) or any other sections within the power distribution system 100 (FIG. 1). Neutral may also be distributed to all the sections within the power distribution system 100 by the neutral bus bar 210. Other embodiments may include fewer or more phase and neutral buses and fewer or more sections within the power distribution system 100.

The section 200 may include bus mounts 202 that brace individual bus bars 204A-204C in the phase bus 204. The bus mounts 202 may also support the neutral bus bar 210. In some embodiments, the bus mounts 202 may support and/or brace vertically oriented bus bars (not shown) in the same manner that they support horizontal bus bars.

A bus mount 202 may be referred to as being a support" when the bus mount 202 couples the bus bar to a structural element within a section 200 of the power distribution system 100 (FIG. 1). These structural elements may include frame members as a described below. A bus mount 202 may be referred to as being a "brace" when the bus mount 202 couples the bus bar to one or more other bus bars, which may include bracing via an intermediate structure. In some embodiments, the bus mounts 202 may support and/or brace both phase bus bars and neutral bus bars.

The bus mounts 202 may be coupled between the neutral bus bar 210 and one or more supporting frame members 208 coupled to a frame 206 in a manner that supports the neutral bus bar 210. The supporting frame members 208 may be coupled to any of a first side 206A (e.g., left side), a second side 206B (e.g., right side), or a third side 206C (e.g., a front side) of the frame 206. The first side 206A of the frame 206 may be opposite facing and parallel to the second side 206B of the frame 206. The third side 206C of the frame 206 may be in-between and situated perpendicular to the first side 206A and the second side 206B. The neutral bus bar 210 may be coupled to the one or more supporting frame members 208 using one or more bus mounts 202. For example, as shown in FIG. 2, a first neutral bus mount 202N1 couples the neutral bus bar 210 to a first supporting frame member 208A secured to the first side 206A (left side) of the frame 206. A second neutral bus mount 202N2 couples the neutral bus bar 210 to a second supporting frame member 208B secured to the second side 206B (right side) of the frame 206.

The bus mounts 202 may also be coupled between each of the bus bars 204A-204C and one or more bracing members 212 in a manner that may brace the bus bars 204A-204C relative to each other. Each of the bus bars 204A-204C may be coupled to the one or more bracing members 212 using one or more bus mounts 202. For example, in FIG. 2, a first A-phase bus mount 202A1 couples the first bus bar 204A to a first bracing member 212A and a second A-phase bus mount 202A2 couples the first bus bar 204A to a second bracing member 212B. Similarly, a first B-phase bus mount 202B1 couples the second bus bar 204B to the first bracing member 212A and a second B-phase bus mount 202B2 couples the second bus bar 204B to the second bracing member 212B. Lastly, a first C-phase bus mount 202C1 couples the third bus bar 204C to the first bracing member 212A and a second C-phase bus mount 202C2 couples the third bus bar 204C to the second bracing member 212B. In FIG. 2, the bracing members 212 are shown as not mounted to the frame 206. In some embodiments, the bracing members 212 may be mounted directly to the frame 206.

Figure 3A:
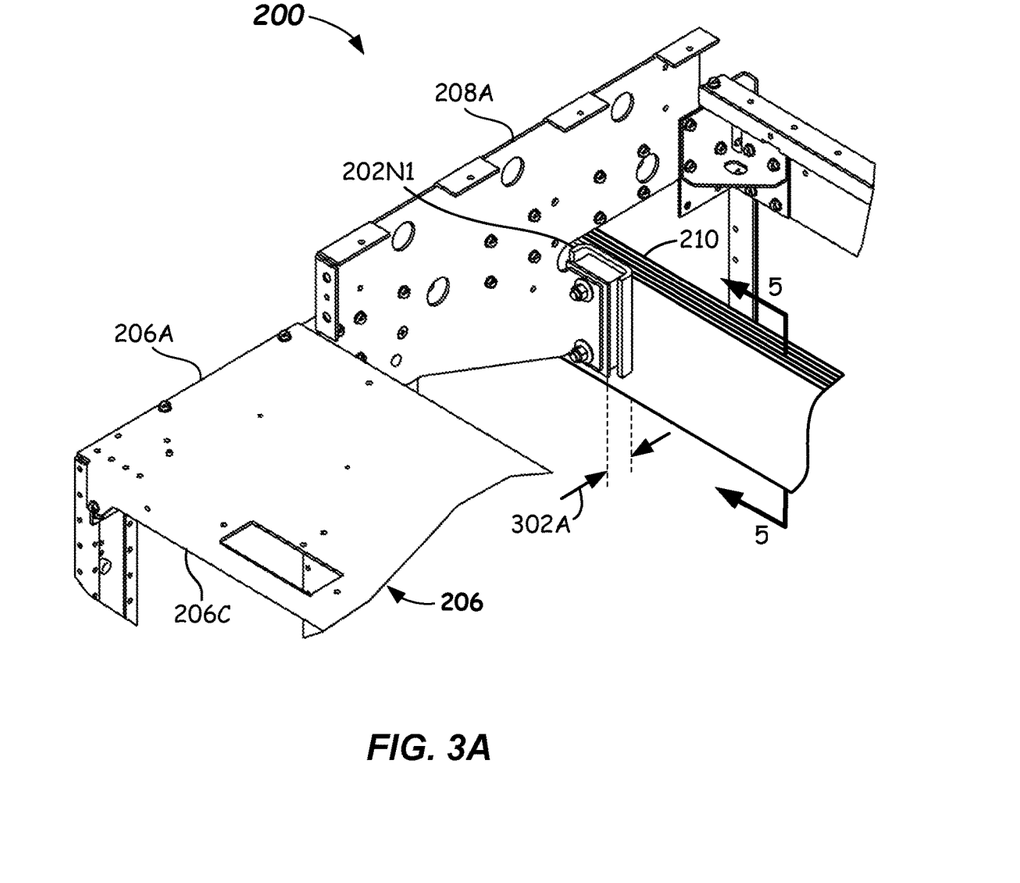
FIG. 3A illustrates a front isometric view of a bus mount supporting a bus bar in a power distribution system according to one or more embodiments.

Additional reference is now made to FIG. 3A, which illustrates an isometric view of a first neutral bus mount 202N1 supporting the neutral bus bar 210 in the section 200 of the power distribution system 100 (FIG. 1) according to one or more embodiments. The second neutral bus mount 202N2 (FIG. 2) may support the neutral bus bar 210 in a similar manner.

The first neutral bus mount 202N1 may support the neutral bus bar 210 to the first supporting frame member 208A. The first supporting frame member 208A may be coupled to any of the first side 206A or the third side 206C of the frame 206. In a like manner the second supporting frame member 208B may be coupled to any of the second side 206B or the third side 206C of the frame 206. In some embodiments, the one or more supporting frame members 208 may each extend substantially perpendicular to the neutral bus bar 210 to which it is secured via the first neutral bus mount 202N1 and the second neutral bus mount 202N2. In other embodiments, the one or more supporting frame members 208 may extend substantially parallel to the neutral bus bar 210.

Figure 5:
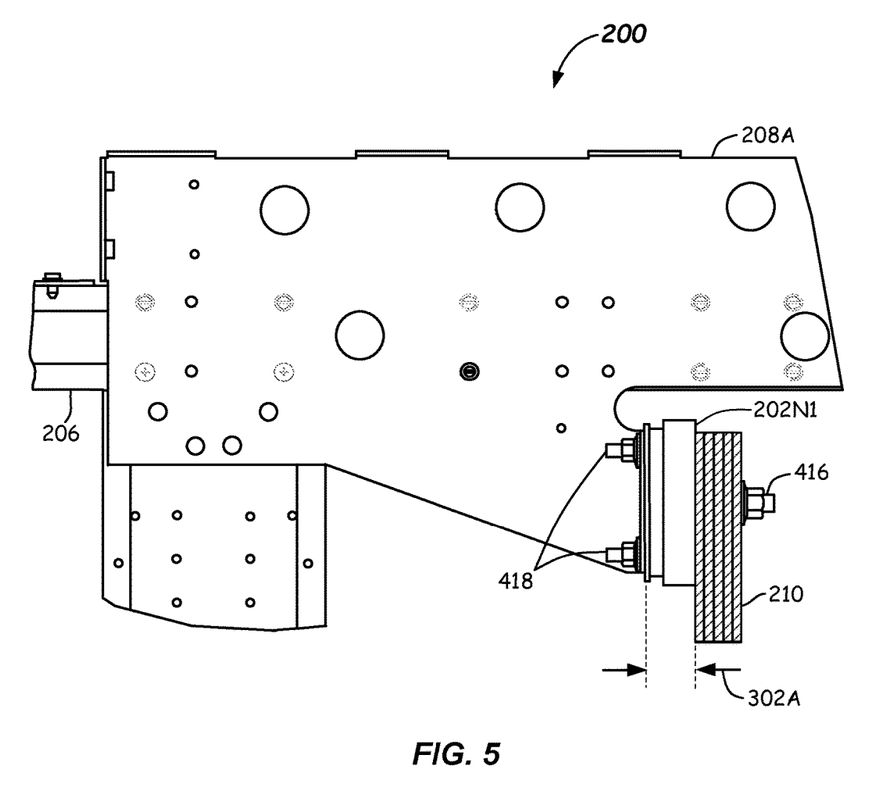
FIG. 5 illustrates a side elevation view of a bus mount supporting a bus bar in a power distribution system according to one or more embodiments.

As shown in FIG. 3A, the first neutral bus mount 202N1 may mechanically couple the neutral bus bar 210 to the first supporting frame member 208A in a manner that maintains a distance 302A of a predetermined value between the neutral bus bar 210 and the first supporting frame member 208A. For example, the distance 302A may provide at least one inch (2.54 cm) separating the neutral bus bar 210 and the first supporting frame member 208A. The distance 302A is also shown in FIG. 5.

Figure 3B:
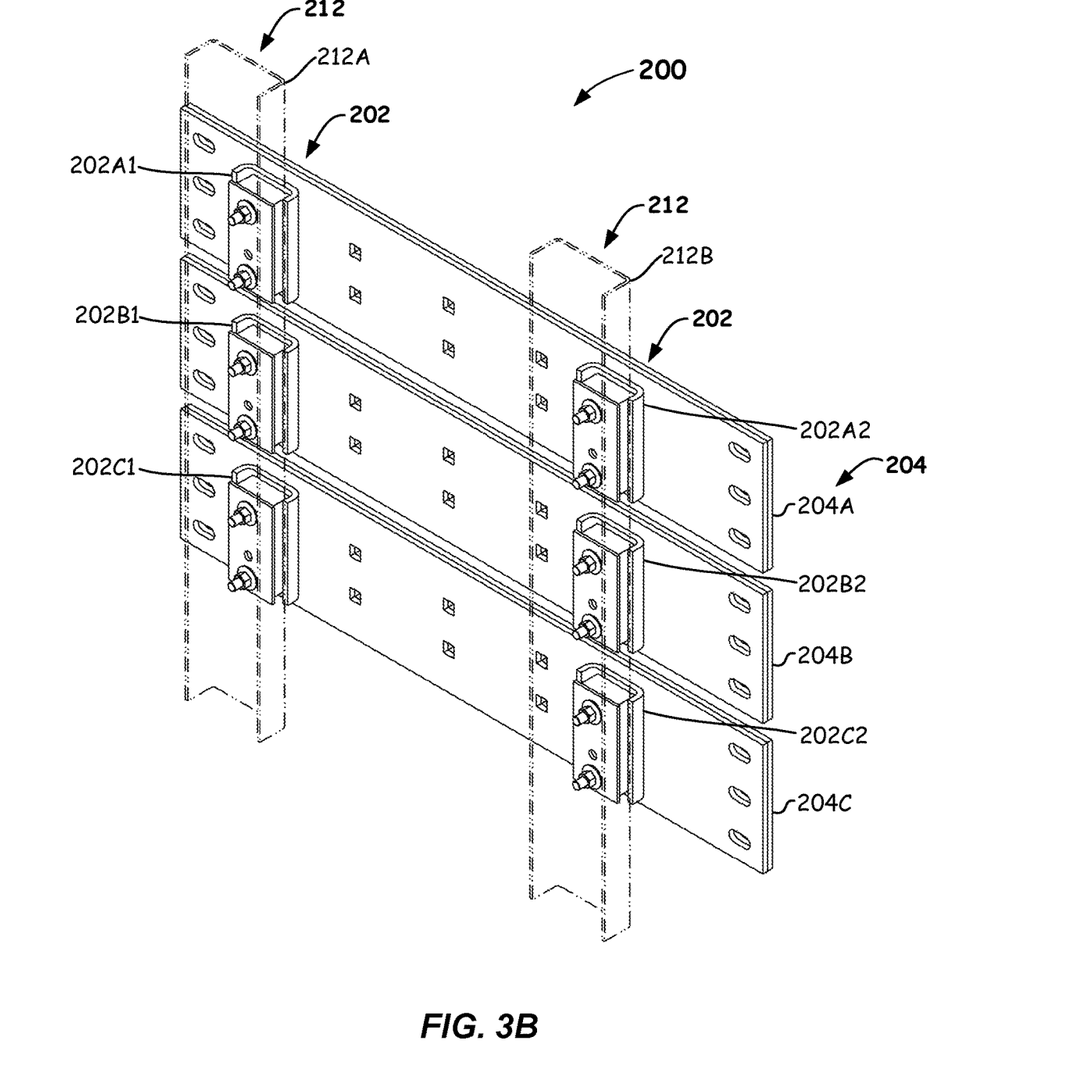
FIG. 3B illustrates a front isometric view of bus mounts bracing bus bars in a power distribution system according to one or more embodiments.
Figure 3C:
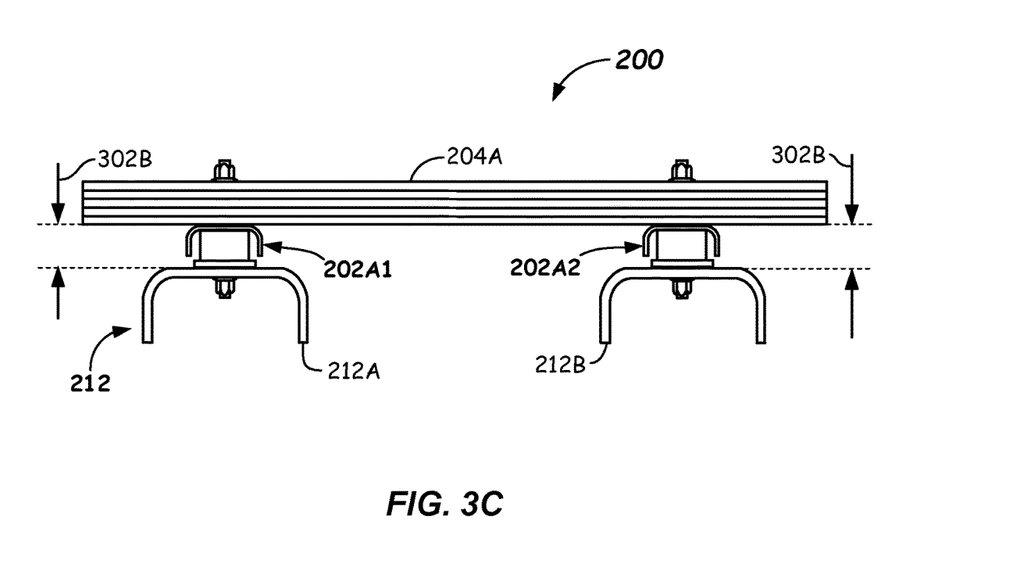
FIG. 3C illustrates a top view of bus mounts, a phase bus bar, and bracing frame members in a power distribution system according to one or more embodiments.

Additional reference is now made to FIGS. 3B and 3C. FIG. 3B illustrates an isometric view of bus mounts 202 bracing the bus bars 204A-204C in the section 200 of the power distribution system 100 (FIG. 1) according to one or more embodiments. FIG. 3C illustrates a top view of the bus mounts 202, the first bus bar 204A, and the bracing members 212. The bus mounts 202 may support the phase bus 204 by coupling each of the bus bars 204A-204C to the bracing members 212 (shown in phantom in FIG. 3B). Each of the bracing members 212 may be coupled across all the bus bars 204A-204C, which brace all the bus bars 204A-204C relative to each other.

The bus mounts 202 may couple the phase bus 204 to the bracing members 212 in a manner that ensures the distance 302B of a predetermined value between each of the bus bars 204A-204C and each of the bracing members 212. The distance 302A and the distance 302B may be equal. In FIG. 3C, as shown, the first A-phase bus mount 202A1 mechanically couples the first bus bar 204A to the first bracing member 212A while maintaining the distance 302B between the first bus bar 204A and the first bracing member 212A. Similarly, the second A-phase bus mount 202A2 mechanically couples the first bus bar 204A to the second bracing member 212B while maintaining the distance 302B between the first bus bar 204A and the second bracing member 212B.

Referring briefly to FIG. 3B, the first B-phase bus mount 202B1 couples the second bus bar 204B to the first bracing member 212A while maintaining the distance 302B between the second bus bar 204B and the first bracing member 212A. Similarly, the second B-phase bus mount 202B2 couples the second bus bar 204B to the second bracing member 212B while maintaining the distance 302B between the second bus bar 204B and the second bracing member 212B.

The first C-phase bus mount 202C1 couples the third bus bar 204C to the first bracing member 212A while maintaining the distance 302B between the third bus bar 204C and the first bracing member 212A. Similarly, the second C-phase bus mount 202C2 couples the third bus bar 204C to the second bracing member 212B while maintaining the distance 302B between the third bus bar 204C and the second bracing member 212B.

The distance 302B may satisfy industry standards for leakage currents and creepage paths. For example, the distance 302B may provide at least one inch (2.54 cm) separating each of the bus bars 204A-204C from the bracing members 212 or other conductive components. The distance 302B may help prevent the development of creepage current between one or more of the bus bars 204A-204C and one or more of the bracing members 212 through the bus mount 202.

Figure 4:
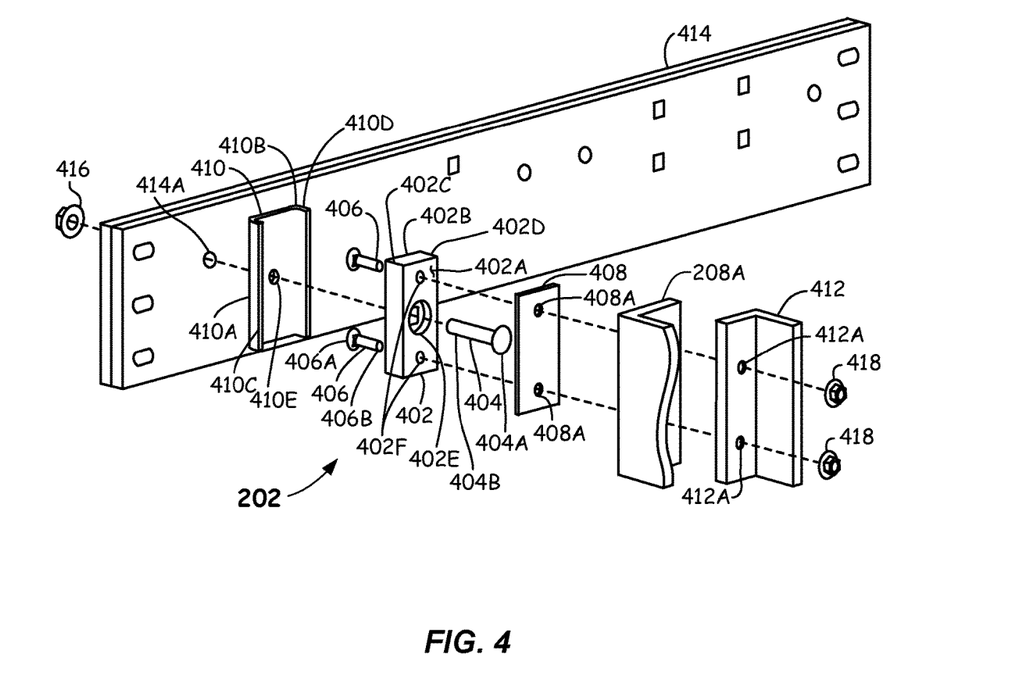
FIG. 4 illustrates an exploded view of a bus mount coupled to a bus bar in a power distribution system according to one or more embodiments.

Reference is now made to FIG. 4, which illustrates an exploded view of a bus mount 202 coupled to a bus bar 414 in a power distribution system 100 (FIG. 1) according to one or more embodiments. The bus bar 414 may be one of the bus bars 204A-204C (FIG. 3B) or the neutral bus bar 210 (FIG. 3A). The bus mount 202 may include a support block 402 formed from a non-conductive (e.g., insulating) material. The support block 402 may be formed from FR-4, G10, and/or composite materials that include a fiberglass reinforced epoxy resin, for example. The support block 402 may be made from other insulating materials.

The support block 402 may be rectangular-shaped with a first side 402A and an opposite second side 402B. The first side 402A and the second side 402B may be joined along at least a first longitudinal edge 402C and an opposite second longitudinal edge 402D. The support block 402 may have other shapes.

The support block 402 may be coupled to the bus bar 414 by one or more first fasteners 404 extending from the second side 402B of the support block 402. In FIG. 4, the one or more first fasteners 404 are shown as being a single bolt 404 formed from a rigid material (e.g., metal). The bolt 404 may be a carriage-type bolt including a self-locking head portion 404A and a threaded portion 404B extending from the head portion 404A. The head portion 404A may be received within a first recess 402E within the first side 402A of the support block 402. The threaded portion 404B may extend from the second side 402B of the support block 402 and may be mechanically received into a hole 414A in the bus bar 414. A nut 416 may be threaded onto the threaded portion 404B from an opposite side of the hole 414A to secure the support block 402 to the bus bar 414. In some embodiments, the one or more first fasteners 404 may be comprised of one or more bolts, each of the one or more bolts received into one or more holes in the bus bar 414. In other embodiments, the one or more first fasteners 404 may be one or more studs (e.g., molded studs) extending from the second side 402B of the support block 402, each of the one or more molded studs received into one or more holes in the bus bar 414.

The support block 402 may be secured to a supporting frame member 208 (FIG. 3A) or a bracing member 212 (FIG. 3B) by one or more second fasteners 406 extending from the first side 402A of the support block 402. In FIG. 4, as shown, the one or more second fasteners 406 are shown as two bolts 406 formed from a rigid material (e.g., metal). The two bolts 406 each may be carriage-type bolts and may include a self-locking head portion 406A and a threaded portion 406B extending from the head portion 406A. Each head portion 406A may be received within second recesses 402F (FIG. 6) on the second side 402B of the support block 402. The threaded portions 406B may extend from the first side 402A of the support block 402 and may be mechanically received into holes in the first bracing member 212A or the supporting frame member 208 (FIG. 3A). The following description describes the support block 402 being mechanically coupled to the first bracing member 212A. The support block 402 may be coupled to other frame members in the same manner described herein.

In some embodiments, the one or more second fasteners 406 may be comprised of one or more bolts 406, each of the one or more bolts 406 may be received into one side of one or more holes in the first bracing member 212A. A pair of nuts 418 may be threaded onto the threaded portions 406B from an opposite side of the holes to secure the support block 402 to the first bracing member 212A. In other embodiments, the second fasteners 406 may be one or more studs (e.g., molded studs) extending from the first side 402A of the support block 402. Each of the one or more studs may be received into one or more holes in the first bracing member 212A.

The bus mount 202 may further include a first insulator 408 and a second insulator 410, each formed from a non-conductive material. The first insulator 408 and the second insulator 410 may each be formed from GP03 or other composite material including a fiberglass reinforced polyester resin, for example. The first insulator 408 and the second insulator 410 may be formed of other insulating materials.

The first insulator 408 may be located between the first side 402A of the support block 402 and the first bracing member 212A, for example. The first insulator 408 may electrically insulate the first fastener 404 from the first supporting frame member 208A. As shown in FIG. 4, the first insulator 408 may electrically insulate the head portion 404A of the first fastener 404, which is coupled to the bus bar 414, from the first supporting frame member 208A. In FIG. 4, as shown, the first insulator 408 is substantially rectangular-shaped with openings 408A through which the one or more second fasteners 406 may pass. The first insulator 408 may have other shapes.

The second insulator 410 may be coupled between the second side 402B of the support block 402 and the bus bar 414. As with the first insulator 408, the second insulator 410 may be positioned between the second side 402B and the bus bar 414 to electrically insulate the one or more second fasteners 406 from the bus bar 414. For example, the second insulator 410 may electrically insulate the head portions 406A of the one or more second fasteners 406 from the bus bar 414. In FIG. 4, as shown, the second insulator 410 may be substantially rectangular-shaped with a first longitudinal edge 410A and an opposite second longitudinal edge 410B and opening 410E through which the one or more first fasteners 404 may pass. The second insulator 410 may have other shapes.

The second insulator 410 may further include a first flange 410C extending from the first longitudinal edge 410A and a second flange 410D extending from the second longitudinal edge 410B. The first flange 410C and the second flange 410D may extend past the first longitudinal edge 402C and the second longitudinal edge 402D of the support block 402, respectively. In other embodiments, a flange may also extend continuously from all four sides of the second insulator 410. The overlap of the first flange 410C with the first longitudinal edge 402C and of the second flange 410D with the second longitudinal edge 402D may prevent rotation of the second insulator 410 relative to the support block 402.

The bus mount 202 may further include a support bracket 412 coupled to the first supporting frame member 208A. The support bracket 412 may include openings 412A through which the one or more second fasteners 406 may pass. The support bracket 412 may be formed from a rigid metal or rigid non-conductive material and may provide additional structural reinforcement such as during short circuit and seismic events.

In FIG. 4, the one or more first fasteners 404 are shown as comprised of a single bolt that is larger than the two bolts comprising the one or more second fasteners 406. In some embodiments, the configuration of the one or more first fasteners 404 and the one or more second fastener 406 may be switched. Specifically, the one or more first fasteners 404 may be comprised of two smaller bolts while the one or more second fasteners 406 may be comprised of one larger bolt. In other embodiments, further variations in the number and relative size of the one or more first fasteners 404 and the one or more second fasteners 406 may be implemented while remaining within the scope the one or more embodiments.

Reference is now made to FIG. 5, which illustrates a side elevation view of the first neutral bus mount 202N1 supporting the neutral bus bar 210 according to one or more embodiments. The first neutral bus mount 202N1 is shown providing the distance 302A between the first supporting frame member 208A and the neutral bus bar 210 while being supported against the frame 206. In another embodiment, the bus mount 202 may provide a similar clearance between one or more of the bracing members 212 (FIG. 3B) and the bus bars 204A-204C.

Figure 6:
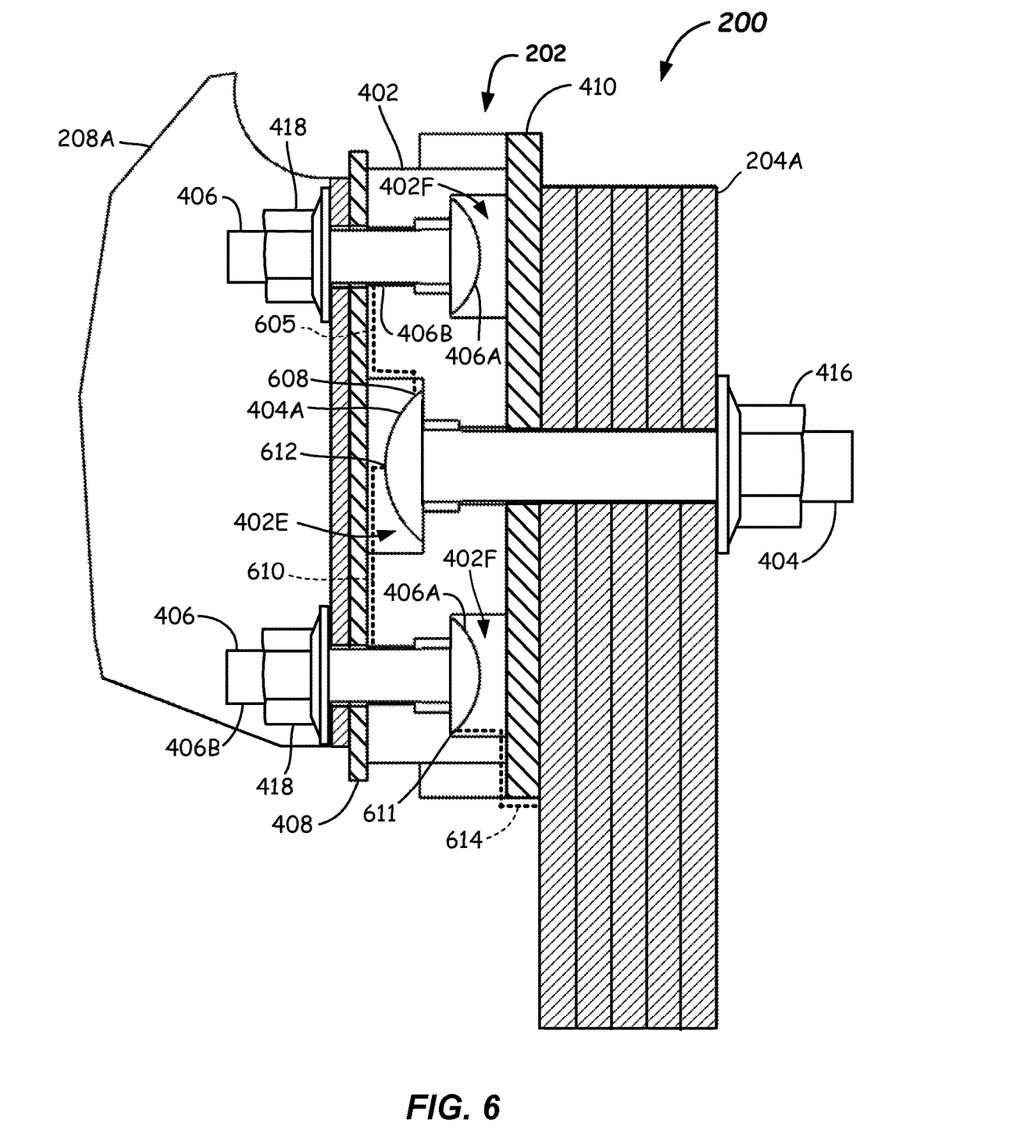
FIG. 6 illustrates a cross-sectional view of a bus mount supporting a bus bar to a frame according to one or more embodiments.

Reference is now made to FIG. 6, which illustrates a cross-sectional view of a bus mount 202 according to one or more embodiments. The distances between the first recess 402E and each of the second recesses 402F are defined within the structure of the support block 402 as to satisfy predetermined distance for of a possible creepage path on the support block 402 between the first bus bar 204A and a frame member coupled via the bus mount 202. The term "frame member" as used herein includes components to which the bus mounts are attached. The creepage path may be defined as the shortest path between two conductive components as measured along a surface of an insulator. In the present embodiments, the creepage path may be the shortest path between one of the phase bus 204 and one of the bracing members 212 as measured along a surface of the support block 402, the first insulator 408, and/or the second insulator 410. Similarly, the creepage path may be shortest path between the neutral bus bar 210 and one of the frame members 208 as measured along a surface of the support block 402, the first insulator 408, and/or the second insulator 410. In some embodiments, the creepage path is the shortest distance between a fastener 404, 406 and a frame member or other conductor.

In FIG. 6, a first creepage path 605 is shown (dotted line) between an edge of the threaded portion 406B of one of the second fasteners 406 and an edge 608 of one of the first fasteners 404. A second creepage path 610 is shown (dotted line) between a top 612 of the head portion 404A of one of the first fasteners 404 and the threaded portion 406B of one or the second fasteners 406. A third creepage path 614 is shown (dotted line) between an edge 611 of one or the second fasteners 406 and the first bus bar 204A. The third creepage path may be shown between a center of the head portion 406A of the second fastener 406 and the first bus bar 204A.

The distances associated with each of the first creepage path 605, the second creepage path 610, the third creepage path 614, and any other creepage paths may meet a predetermined value. In one embodiment, the support block 402 is dimensioned and structured such that a distance associated with any creepage path between the neutral bus bar 210 and a frame member 208 to which it is mounted is at least one inch (2.54 cm). Similarly, the support block 402 is dimensioned and structured such that a distance associated with any creepage path between the phase bus 204 and a bracing member 212 to which it is braced is at least one inch (2.54 cm). These distances help to minimize the development of creepage currents through the support block 402. Moreover, the presence of the first insulator 408 and the second insulator 410 allow for minimizing the distance 302A between the first supporting frame member 208A and the neutral bus 210 as well as the distance 302B between each of the bus bars 204A-204C and each of the bracing members 212.

Figure 7:
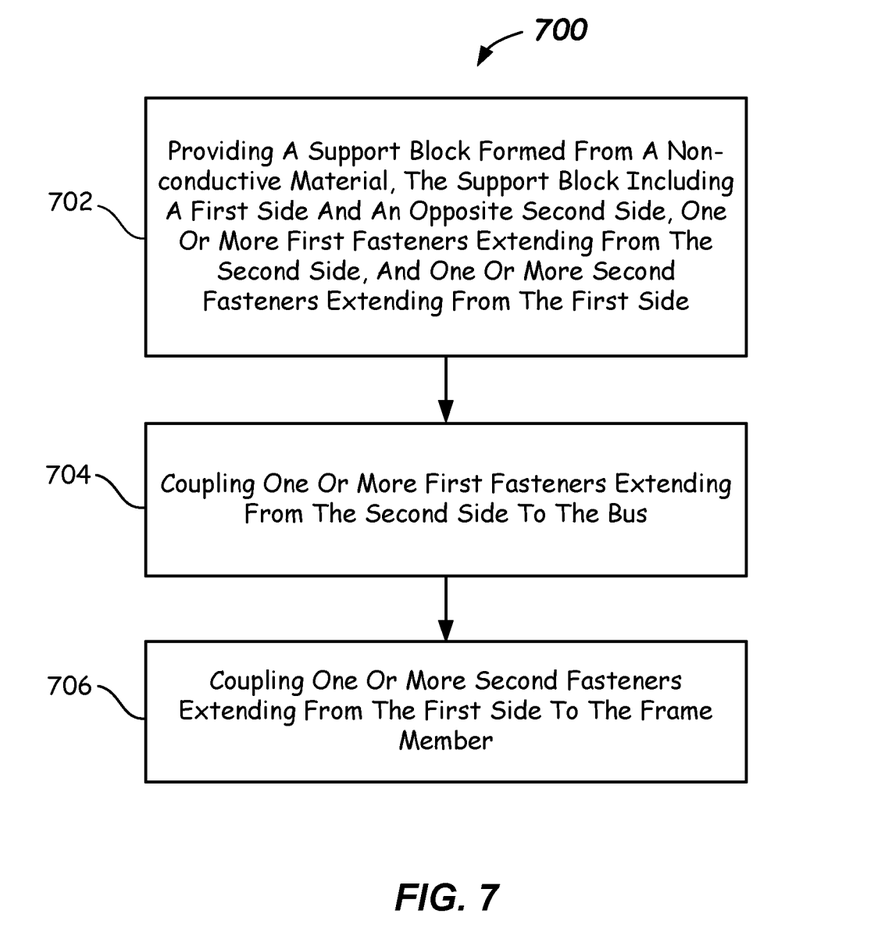
FIG. 7 illustrates a flowchart of a method of mounting a bus bar to a frame member in a power distribution system according to one or more embodiments.

Reference is now made to FIG. 7, which illustrates a flowchart of a method 700 of mounting a bus bar (e.g., bus bars 204A-204C and neutral bus bar 210) to a frame member in a power distribution system (e.g., power distribution system 100). The method 700 may include, at 702, providing a support block (e.g., support block 402) formed from a non-conductive material and including a first side (e.g., first side 402A) and an opposite second side (e.g., second side 402B). The method 700 may include, in 704, coupling one or more first fasteners extending from the second side to the bus bar. The method 700, in 706, may include coupling one or more second fasteners extending from the first side to the frame member.

It should be readily appreciated that the present disclosure is susceptible of broad utility and application. Many embodiments and adaptations of the present disclosure other than those herein described, as well as many variations, modifications, and equivalent arrangements, will be apparent from, or reasonably suggested by, the present disclosure and the foregoing description thereof, without departing from the substance or scope of the present disclosure. Accordingly, while the present disclosure has been described herein in detail in relation to specific embodiments, it is to be understood that this disclosure is only illustrative and presents examples of the present disclosure and is made merely for purposes of providing a full and enabling disclosure. This disclosure is not intended to be limited to the particular apparatus, assemblies, systems and/or methods disclosed, but, to the contrary, the intention is to cover all modifications, equivalents, and alternatives falling within the scope of the claims.

What is claimed is:
1. A power distribution system, comprising:
a bus bar;
a frame member;
a support block formed from a non-conductive material and having a first side and an opposite second side;

one or more first fasteners extending beyond the second side and mechanically coupled to the bus bar;
one or more second fasteners extending beyond the first side and mechanically coupled to the frame member; and
a first insulator located between the first side of the support block and the frame member, wherein the one or more first fasteners do not extend through the first insulator and the one or more second fasteners extend through the first insulator.

2. The power distribution system of claim 1, wherein the frame member is a supporting frame member.

3. The power distribution system of claim 1, wherein the frame member is a bracing member.

4. The power distribution system of claim 1 further comprising a second insulator located between the second side of the support block and the bus bar.

5. The power distribution system of claim 4, wherein the second insulator further comprises a longitudinal edge and a flange extending from the longitudinal edge.

6. The power distribution system of claim 1 further comprising a second insulator located between the second side of the support block and the bus bar, wherein at least one of the first insulator and the second insulator is formed from a fiberglass reinforced polyester resin.

7. The power distribution system of claim 1, wherein the support block is configured such that a distance between the bus bar and the frame member is at least 2.54 cm.

8. The power distribution system of claim 1, wherein the support block is configured such that a distance for any creepage path on the support block is at least 2.54 cm.

9. The power distribution system of claim 1, wherein the support block is formed from a fiberglass reinforced epoxy resin.

10. The power distribution system of claim 1, wherein the one or more first fasteners include one or more first bolts extending at least partially through the support block and beyond the second side; and
wherein the one or more second fasteners include one or more second bolts extending at least partially through the support block and beyond the first side.

11. The power distribution system of claim 1, wherein the one or more first fasteners comprise a single bolt and the one or more second fasteners comprise two bolts.

12. A bus mount for a power distribution system comprising:
a support block formed from a non-conductive material and having a first side and an opposite second side;
one or more first fasteners extending beyond the second side and configured to mechanically couple to a bus bar;
one or more second fasteners extending beyond the first side and configured to mechanically couple to a frame member; and
a first insulator located between the first side of the support block and the frame member, wherein the one or more first fasteners do not extend through the first insulator and the one or more second fasteners extend through the first insulator.

13. The bus mount of claim 12, wherein the first insulator is formed from a non-conductive material positioned adjacent the first side of the support block.

14. The bus mount of claim 12 further comprising a second insulator formed from a non-conductive material positioned adjacent the second side of the support block.

15. The bus mount of claim 14, wherein at least one of the first insulator and the second insulator is formed from a fiberglass reinforced polyester resin.

16. The bus mount of claim 12, wherein the support block is formed from a fiberglass reinforced epoxy resin.

17. The bus mount of claim 12, wherein the support block is configured such that a distance for any creepage path on the support block is at least 2.54 cm.

18. The bus mount of claim 12, wherein the support block is configured as to provide a distance of at least 2.54 cm between a bus bar and a frame member.

19. A method of mounting a bus bar to a frame member in a power distribution system, comprising:
providing a support block formed from a non-conductive material, the support block including a first side and an opposite second side, one or more first fasteners extending from the second side, and one or more second fasteners extending from the first side;
coupling one or more first fasteners extending from the second side to the bus bar;
coupling one or more second fasteners extending from the first side to the frame member; and
providing a first insulator located between the first side of the support block and the frame member, wherein the one or more first fasteners do not extend through the first insulator and the one or more second fasteners extend through the first insulator.

20. The power distribution system of claim 1, further comprising:
a second insulator located between the second side of the support block and the bus bar, wherein the one or more first fasteners extend through the second insulator and the one or more second fasteners do not extend through the second insulator.

* * * * *